(12) United States Patent
Hartung et al.

(10) Patent No.: US 9,845,199 B2
(45) Date of Patent: Dec. 19, 2017

(54) INPUT UNIT FOR A REVERSE VENDING MACHINE, AND REVERSE VENDING MACHINE

(71) Applicant: Wincor Nixdorf International GmbH, Paderborn (DE)

(72) Inventors: Domenic Hartung, Molsdorf (DE); Axel Fischer, Ilmenau (DE); Patrick Rhein, Ilmenau (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 15/294,808

(22) Filed: Oct. 17, 2016

(65) Prior Publication Data

US 2017/0113880 A1 Apr. 27, 2017

(30) Foreign Application Priority Data

Oct. 21, 2015 (EP) .................................... 15190839

(51) Int. Cl.
  *B65G 37/00* (2006.01)
  *G07F 7/06* (2006.01)
  *G07F 9/10* (2006.01)

(52) U.S. Cl.
  CPC ............. *B65G 37/005* (2013.01); *G07F 7/06* (2013.01); *G07F 7/0609* (2013.01); *G07F 9/10* (2013.01)

(58) Field of Classification Search
  CPC .................................. B65G 37/005; G07F 7/06
  See application file for complete search history.

(56) References Cited

U.S. PATENT DOCUMENTS

| | | | | |
|---|---|---|---|---|
| 5,161,661 A * | 11/1992 | Hammond | ............ | G07F 7/0609 194/209 |
| 6,678,578 B2 * | 1/2004 | Holmen | ................. | B07C 5/3408 198/370.07 |
| 6,776,279 B2 * | 8/2004 | Krull | ...................... | B65G 47/24 198/626.1 |
| 7,110,590 B2 * | 9/2006 | Nordbryhn | ........... | B07C 5/3408 348/125 |
| 7,284,666 B2 * | 10/2007 | Tvinnereim | .......... | B07C 5/3408 209/523 |
| 7,407,056 B2 * | 8/2008 | Lutz | ..................... | B65G 37/005 198/626.1 |
| 7,689,316 B1 * | 3/2010 | Frederick | .............. | G06F 19/327 700/231 |

(Continued)

FOREIGN PATENT DOCUMENTS

| | | |
|---|---|---|
| DE | 102004054284 A1 | 5/2006 |
| DE | 202009002937 U1 | 5/2009 |
| EP | 2727860 A1 | 5/2014 |

OTHER PUBLICATIONS

European Search Report based on application No. 15190839.9 (8 pages) dated Apr. 12, 2016 (for reference purpose only).
Machine translation of DE 202009002937 U1.

*Primary Examiner* — Thomas Randazzo
(74) *Attorney, Agent, or Firm* — Black McCuskey Souers and Arbaugh LPA

(57) ABSTRACT

Various embodiments provide an input unit for a reverse vending machine. The input unit includes a conveying unit with at least one conveying belt configured to receive and transport an empty container, and a guide structure configured to carry and guide the conveying unit relative to a housing of the reverse vending machine.

20 Claims, 4 Drawing Sheets

(56) References Cited

U.S. PATENT DOCUMENTS

| | | | | |
|---|---|---|---|---|
| 8,851,265 B2* | 10/2014 | Morishita | ............... | B08B 3/02 |
| | | | | 194/208 |
| 8,890,709 B2* | 11/2014 | Thiel | ............... | G01N 1/36 |
| | | | | 340/815.67 |
| 9,399,555 B2* | 7/2016 | Fonnelop | ............... | B65G 21/06 |
| 2006/0289276 A1* | 12/2006 | Hecht | ............... | B08B 1/02 |
| | | | | 198/495 |
| 2014/0048391 A1* | 2/2014 | Beyer | ............... | B07C 5/122 |
| | | | | 198/836.1 |

* cited by examiner

INPUT UNIT FOR A REVERSE VENDING MACHINE, AND REVERSE VENDING MACHINE

CROSS-REFERENCE TO RELATED APPLICATION

This application claims priority to European Patent Application Serial No. EP 15 190 839.9, which was filed Oct. 21, 2015, and is incorporated herein by reference in its entirety.

TECHNICAL FIELD

Various embodiments relate generally to an input unit for a reverse vending machine, and to a reverse vending machine.

BACKGROUND

Empty containers, e.g. reusable bottles, for example plastic bottles and glass bottles, are returned by consumers using reverse vending machines, which are erected for example in supermarkets. For this purpose, the consumers introduce the empty containers usually individually into the reverse vending machines and, in the latter, the type of empty container is sensed by a sensing unit. The empty container is then transported away by an input unit (clearly also referred to as a transporting unit) of the reverse vending machine and discharged, e.g. to a collecting container, for further use/recycling. However, the empty container introduced into the reverse vending machine often contains residual liquid, e.g. the remains of lemonade or beer, which can escape during handling of the empty container in the reverse vending machine. In this case inter alia the transporting unit of the reverse vending machine is vulnerable to the effects of sticky residual liquid, i.e. the transporting unit becomes sticky, and in addition unpleasant odours are generated by the sticky residual liquid. Consequently, (regular) cleaning of the reverse vending machine, e.g. of the input unit, is necessary. The cleaning is time-consuming, constitutes an onerous task on account of the constricted space conditions in the reverse vending machine, and reduces the availability of the reverse vending machine.

EP 2 727 860 A1 discloses, for a reverse vending machine, for example a conveying-belt module which can be coupled to a base unit in a releasable manner and can be removed from the reverse vending machine.

DE 10 2004 054 284 B4 discloses, for example, a conveying unit for containers (drinks containers). The conveying unit is coupled to a weighing unit and a drive unit in a releasable manner.

SUMMARY

Various embodiments provide an input unit for a reverse vending machine. The input unit includes a conveying unit with at least one conveying belt configured to receive and transport an empty container, and a guide structure configured to carry and guide the conveying unit relative to a housing of the reverse vending machine.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3A shows a schematic, lateral sectional view of a reverse vending machine with an exemplary embodiment of an input unit, wherein a door of the reverse vending machine is closed and a conveying unit has been pushed in;

DESCRIPTION

Figure 1A:
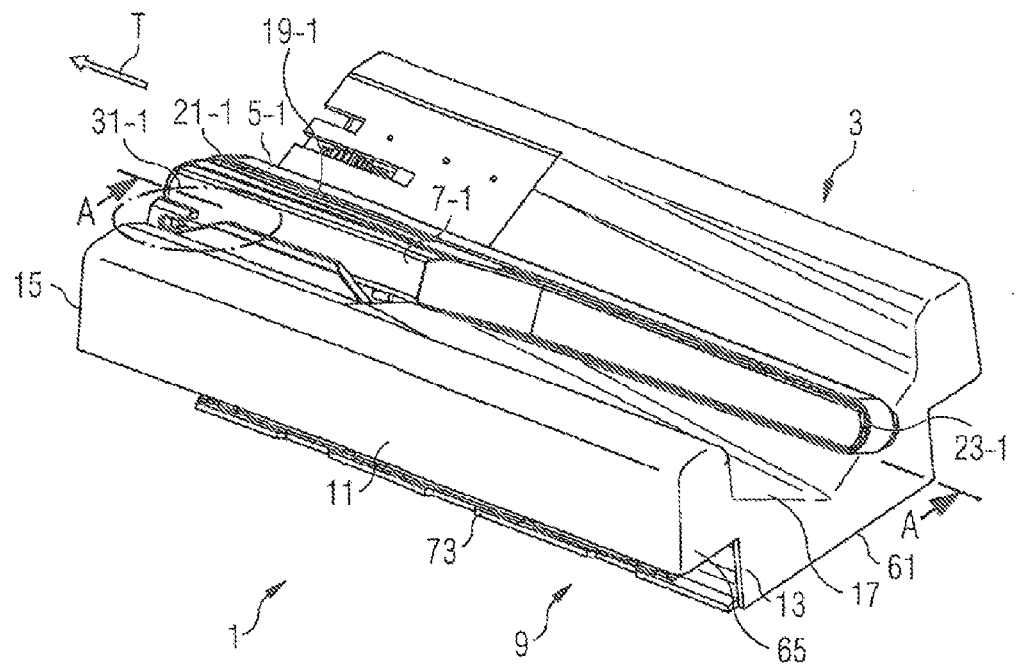
FIG. 1A shows a perspective view of an embodiment of an input unit.

The following detailed description refers to the accompanying drawings, which form part of said description and, for illustrative purposes, show specific embodiments in which the invention can be implemented. In this respect, use is made of directional terminology such as "top/upwards", "bottom/downwards", "forward(ly)", "rearward", "front", "rear", etc. in relation to the orientation of the figure(s) described. Since components of embodiments can be positioned in a number of different orientations, the directional terminology serves for illustrative purposes and is in no way limiting. Of course, it is possible to use other embodiments and to implement structural or logical modifications without departing from the scope of protection of the present invention. It is, of course, possible for the features of the various exemplary embodiments described herein to be combined with one another, unless specifically stated otherwise. The following detailed description should therefore not be interpreted as being limiting, and the scope of protection of the present invention is defined by the appended claims.

Within the context of this description, the terms "connected", "attached" and "coupled" are used for describing direct and indirect connection, direct or indirect attachment and direct or indirect coupling. In the figures, identical or similar elements are provided with identical reference signs, if expedient.

Various embodiments provide an input unit for a reverse vending machine, and a reverse vending machine, which are easily accessible for cleaning/maintenance.

The expression "forward(ly)" here denotes a region/a direction which corresponds to a front side of the reverse vending machine, and the expression "rearward" or "rear side" denotes a region/a direction which corresponds to a rear side of the reverse vending machine. Furthermore, a transporting direction defined herein for empty containers extends, for example, at least essentially along a forward/rearward direction of the reverse vending machine, i.e. the transporting direction is located at least essentially in a horizontal plane. A vertical direction/top-bottom direction (gravitational-force direction) of the reverse vending machine is at least essentially perpendicular to the horizontal plane.

Furthermore, the expression "empty container" denotes a single (at least essentially) empty drinks container, e.g. a reusable bottle, for example a plastic bottle or glass bottle, a disposable bottle, for example a PET bottle (PET: polyethyleneterephthalate), or a drinks can, for example an aluminium can.

An input unit for a reverse vending machine according to an embodiment may have a conveying unit with, for example, at least one conveying belt (e.g. also with a series of conveying rollers which form a transporting device) for receiving and transporting the empty container. It is also possible for the input unit to have a guide structure (e.g. a guide rail/a pair of guide rails) for carrying and guiding the conveying unit relative to a housing of the reverse vending machine.

Moreover, the conveying unit may have a liquid drain (which terminates, for example, at a front end of the conveying unit, e.g. in the form of a forwardly inclined channel or ramp), so that any residual liquid escaping from the empty container can be directed away (said residual liquid then being collected in the reverse vending machine, for example, at a location separate from the conveying unit).

The conveying unit may be designed such that the empty container placed on the at least one conveying belt can be transported along the transporting direction, for example in a horizontal state and with the base of the empty container to the front. The guide structure is arranged for carrying and guiding the conveying unit for example along the transporting direction, i.e. the conveying unit can be moved for example selectively along the transporting direction. Furthermore, the conveying unit can be designed, for example, such that, in addition to transporting the empty container, it can rotate the latter selectively, e.g. about an axis parallel to the transporting direction. This rotation of the empty container can be used to make it possible for an empty-container-sensing device (e.g. a scanner, for example a barcode scanner) of the reverse vending machine to sense essentially all the sides of the empty container on the conveying unit. This makes it possible for the empty-container-sensing device to determine the type of empty container. Such empty-container-sensing devices and empty-container-rotating devices are known to a sufficient extent.

The conveying unit may have, for example, a plurality of conveying belts arranged at an angle in relation to one another, for example two, three, four or more conveying belts, which, by means of associated conveying-belt transporting surfaces, form a trough shape (e.g. V-shaped or U-shaped) in order for the empty container which is to be transported to be received and supported therein. Alternatively, it is also possible for example for the at least one conveying belt itself to be of U-shaped or V-shaped configuration, in order to receive, and support, the empty container.

The at least one conveying belt can circulate, for example, on a conveying-belt carrying arm which, at one (e.g. rear) end, is coupled to the conveying unit, on an upper side thereof, in a releasable manner, by a displacement-action coupling device and a (e.g. two) pivoting-action coupling device(s). The displacement-action coupling device may be, for example, a coupling panel (e.g. a coupling plate) which projects on the lower side of the conveying-belt carrying arm and of which the panel surfaces are for example at least essentially parallel to the transporting direction and for example at least essentially perpendicular to the conveying-belt transporting surface. It is also possible for the coupling panel to have a slot on a rear periphery, the slot being capable of selective engagement with a corresponding cross-piece of the conveying unit. That is to say, when the displacement-action coupling device is coupled, the cross-piece is accommodated in the slot and movement of the conveying-belt carrying arm along the transporting direction is allowed (e.g. for removal of the conveying-belt carrying arm together with the conveying belt), whereas movement in a direction transverse to the transporting direction is prevented. It is also possible for the pivoting-action coupling device to have a pin, which projects laterally on the conveying-belt carrying arm (e.g. at a rear end thereof), and a corresponding groove, which is formed on the conveying unit. For coupling/uncoupling of the conveying-belt carrying arm, the pin can be inserted into the associated groove, this making it possible for the conveying-belt carrying arm to be pivoted and displaced by means of the pivoting-action coupling device. Furthermore, by virtue of the pivoting-action coupling device, the conveying-belt carrying arm can be latched (e.g. locked mechanically or magnetically) on the conveying unit, the conveying-belt carrying arm therefore being fixed on the conveying unit. This means that the conveying-belt carrying arm can be released from the conveying unit for cleaning and/or maintenance and replaced, for example, by another (clean) conveying-belt carrying arm, the conveying unit therefore being ready for use again in short order. In addition, the changeover of the conveying-belt carrying arms makes it possible for the conveying unit to be adapted to different types of empty container.

The guide structure of the input unit can have at least one rail (e.g. also a pair of rails), on which the conveying unit is carried, and guided, in a displaceable manner.

The at least one rail may be designed, for example, in the form of a telescopic rail, e.g. in the form of a pull-out telescopic rail, of which, for example, one rail element is fixed to the housing of the reverse vending machine and, for example, another (the other) rail element is fixed to the conveying unit. Accordingly, the conveying unit can be moved, for example, along the transporting direction, e.g. can be moved selectively out of the reverse vending machine. This can be used to provide easy access to the conveying unit for maintenance and/or cleaning work.

The conveying unit may be designed, for example, in the form of a drawer, e.g. in the form of a pull-out drawer. For example, the conveying unit may be configured such that it can be moved out (e.g. pulled out manually) of the reverse vending machine in the manner of a drawer.

It is also possible for the input unit to have at least one drive for driving the at least one conveying belt.

The drive may have a motor, e.g. an electric motor. The motor may be arranged within the conveying unit, and it is therefore protected against escaping residual liquid.

It is also possible for the input unit to have a plurality of drives for driving the plurality of conveying belts, wherein in each case one drive for driving a respectively associated conveying belt is coupled to the respective conveying belt (e.g. coupled directly or by means of a gear mechanism, e.g. a toothed gear mechanism).

The conveying unit may be coupled to the guide structure in a releasable manner, e.g. by means of quick-release fasteners and/or screw connections.

The conveying unit may further have a carrier plate and one or more printed circuit boards which are mounted on the carrier plate and have at least one drive-control circuit. It is possible for the carrier plate to be made in one piece for example with the conveying unit or to be made separately therefrom. The carrier plate may be arranged within the conveying unit for example such that it is protected against escaping residual liquid.

The conveying unit may further have a weighing machine (e.g. an empty-container-weighing machine) with one or more load cells, wherein the at least one conveying belt is arranged on the weighing machine. The weighing machine may serve, for example, to sense a weight of an empty container currently being transported on the conveying unit. On the basis of the weight sensed, e.g. in conjunction with the empty-container-sensing device, it is possible to determine the type of empty container. The weighing machine may be arranged, for example, between the conveying unit and the conveying belt, in order to carry the conveying belt (e.g. by means of the associated conveying-belt carrying arm).

The carrier plate may be uncoupled from the weighing machine in respect of forces, vibrations/jarring caused by empty-container transportation thus being kept away from the carrier plate.

A reverse vending machine according to an embodiment may have a housing, a door and the input unit described above. The housing encloses the reverse vending machine and can be opened and closed on the front side of the reverse vending machine by the door, which is fastened on the housing, for example in a pivotable manner. In a closed state of the door, the reverse vending machine is not accessible, whereas, in an open state of the door, the reverse vending machine is accessible on its front side (e.g. it is easy to reach the pull-out/pulled-out conveying unit). The door further has an opening, through which the empty container can be introduced into the reverse vending machine. The input unit with the conveying unit may be arranged in the housing relative to the opening such that an empty container guided through the opening can be placed on the at least one conveying belt. If the reverse vending machine is not accessible, access to the guide structure of the input unit is prevented.

It is further possible, in the open state of the reverse vending machine, for access to the guide structure to be allowed and for the conveying unit to be moved counter to the transporting direction, e.g. to be pulled/moved out of the reverse vending machine (e.g. for cleaning and/or maintenance).

FIG. 1A shows a perspective view of an embodiment of an input unit 1 for a reverse vending machine (not shown).

The input unit 1 has: a conveying unit 3 with a first and a second conveying belt 5-1, 5-2, which circulates around an associated first and second conveying-belt carrying arm 7-1, 7-2, and a guide structure 9. The conveying unit 3 has a for example at least essentially elongate housing 11, which has a front end 13, which is directed towards the front side of the reverse vending machine, and a rear end 15, which is directed towards the rear side of the reverse vending machine. The conveying unit 3, e.g. on its upper side, front side, rear side and along the sides, is enclosed by the housing 11, i.e. the interior of the conveying unit 3 is protected against residual liquid by the housing 11. The housing 11, on its upper side, has a for example V-shaped channel 17, which extends, for example, from the rear end 15 to the front end 13. The channel 17 slopes in the direction of the front end 13, which in this case begins, by way of example, in a region between the front and the rear ends 13, 15 (e.g. approximately centrally between the front and the rear ends 13, 15 or, for example, approximately a third of the way along the distance between the rear and the front ends 13, 15). The channel 17 allows residual liquid escaping from the empty container (not shown) to flow out to the front end 13 of the conveying unit 3 (where it then flows out for example into a collecting container (not shown)).

At the rear end 15 of the conveying unit 3, the first and the second conveying-belt carrying arms 7-1, 7-2 are coupled to the upper side of the conveying unit 3 in a releasable manner on either side of the channel 17. The conveying-belt carrying arms 7-1, 7-2 are arranged outside the housing 11. The first or the second conveying-belt carrying arms 7-1, 7-2 has, at its rear end, a respective first or second drive roller 21-1, 21-2 and, to the front end, a respective first or second guide roller 23-1, 23-2, around which the first or the second conveying belt 5-1, 5-2 runs and is guided. The conveying-belt carrying arms 7-1, 7-2 extend along the upper side of the housing 11 in the direction of the front end 13 and extend in the forward direction beyond said front end. The conveying belts 5-1, 5-2 of the conveying-belt carrying arms 7-1, 7-2 are oriented in a manner corresponding to the channel 17, i.e. associated first and second conveying-belt surfaces 19-1, 19-2 of the conveying belts 5-1, 5-2 form a V shape, of which the tip is oriented downwards (in the direction of the vertex of the channel 17). The movement direction of the conveying belts 5-1, 5-2 defines a transporting direction T for the empty container. The transporting direction T runs for example essentially from the front end 13 to the rear end 15 of the conveying unit 3 in, for example, a horizontal plane of the reverse vending machine.

The conveying unit 3 is used such that an empty container introduced into the reverse vending machine can be transported away by means of the first and the second conveying belts 5-1, 5-2 (using a drive explained hereinbelow). For this purpose, the empty container, for example a bottle, is placed by a user, e.g. the bottom of the bottle at the front, in the V-shaped region defined by the conveying-belt surfaces 19-1, 19-2, a lateral surface of the bottle therefore coming into contact with the first and with the second conveying-belt surfaces 19-1, 19-2 and being centred in the (by the) V-shaped region. The bottle is then transported away by the conveying belts 5-1, 5-2 in the transporting direction T to a rear side of the reverse vending machine, and the conveying unit 3 is therefore ready to receive a new bottle. When the bottle is being placed in position and/or transported, residual liquid contained therein can escape, and then flows into the channel 17, either directly or via the conveying belts 5-1, 5-2 or the conveying-belt carrying arms 7-1, 7-2, and is directed to the front end 13 of the conveying unit 3.

The structure of the first and of the second conveying-belt carrying arms 7-1, 7-2 will be described hereinbelow by way of the first conveying-belt carrying arm 7-1 and with reference to FIG. 1A, FIG. 1B, FIG. 2A and FIG. 2B; the second conveying-belt carrying arm 7-2 has an analogous structure and will not be described separately. The first conveying-belt carrying arm 7-1 of the conveying unit 3 is coupled to the conveying unit 3 in a releasable manner via an outer and an inner first pivoting-action coupling device 31-1 and via a first displacement-action coupling device 33-1.

As is shown in FIG. 1A, an outer first pivoting-action coupling device 31-1 is arranged laterally on the first conveying-belt carrying arm 7-1. For the sake of clarity, an inner first pivoting-action coupling device 31-1 is not shown; this is arranged on the other side (side of the channel 17) of the first conveying-belt carrying arm 7-1 in a manner analogous to the outer first pivoting-action coupling device 31-1.

Figure 1B:
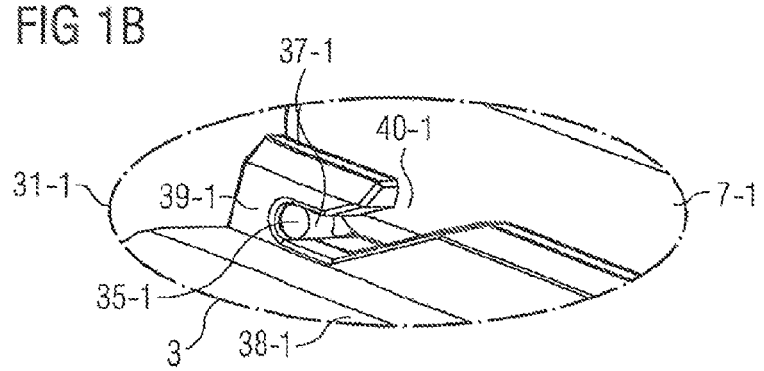
FIG. 1B shows a detail of the input unit which is shown in FIG. 1A.

FIG. 1B shows a detail of the outer first pivoting-action coupling device 31-1, which has a first pin 35-1 on the first conveying-belt carrying arm 7-1 and a first groove 37-1 on the conveying unit 3. The first pin 35-1 can be brought into engagement with the corresponding first groove 37-1 of the conveying unit 3. The first pin 35-1 projects in a direction transverse to the transporting direction T (e.g. parallel to the conveying-belt surface 19-1) at a rear end (e.g. directly at, or adjacent to, the rear end) of the first conveying-belt carrying arm 7-1, on the outer side thereof. The corresponding first groove 37-1 is formed in a first coupling rail 38-1 formed at the rear end 15 on the upper side of the conveying unit 3, i.e. the coupling rail 38-1 projects upwards beyond the housing 11. The first coupling rail 38-1 extends at least essentially along the conveying direction T. A first locking portion 39-1 for locking the first pin 35-1 is provided in a rear region of the first groove 37-1. A first introduction portion 40-1 is provided in a front region of the first groove 37-1, said introduction portion being inclined upwards in relation to the transporting direction T, and therefore direct movement of the first pin 35-1 in the first groove 37-1 along the transporting direction T in the first introduction portion 40-1 is not possible. The first conveying-belt carrying arm 7-1 can be placed between the outer and the inner first coupling rails 38-1 (only the outer first coupling rail 38-1 is shown in FIG. 1A and FIG. 1B). In the coupled state of the first conveying-belt carrying arm 7-1 and the conveying unit 3, the first pin 35-1 is accommodated in a locked state, e.g. in a form-fitting manner by a catch (not illustrated), in the associated locking portion 39-1 of the first groove 37-1.

Figure 2A:
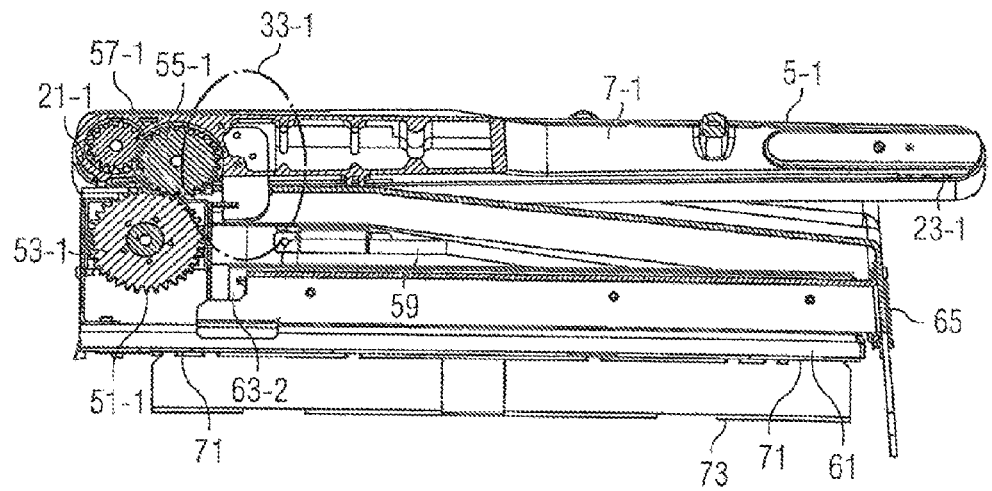
FIG. 2A shows a sectional view taken along line A-A through the input unit shown in FIG. 1A.
Figure 2B:
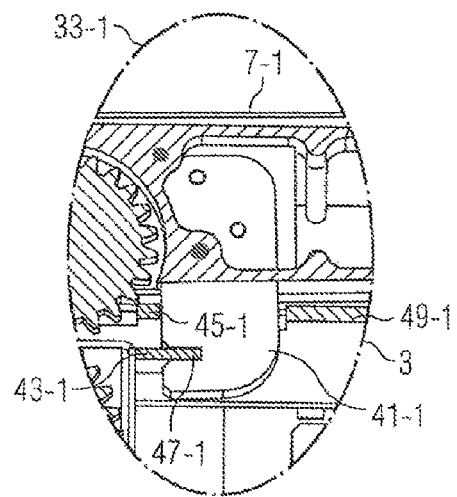
FIG. 2B shows a detail of the input unit which is shown in FIG. 2A.

The first displacement-coupling device 33-1 is illustrated in FIG. 2A, which is a sectional view of the conveying unit 3 taken along line A-A from FIG. 1A, and in FIG. 2B, which is a detail of FIG. 2A.

The first displacement-action coupling device 33-1 has a first coupling plate 41-1, which projects downwards on the conveying-belt carrying arm 7-1, and a corresponding first crosspiece 43-1, which is formed in the interior of the conveying unit 3. The first coupling plate 41-1 projects, at least essentially perpendicularly to the first conveying-belt surface 19-1, on the underside, e.g. with lateral offsetting in relation to the first conveying belt 5-1, of the first conveying-belt carrying arm 7-1. Plate surfaces of the first coupling plate 41-1 extend at least essentially along the transporting direction T and perpendicularly to the first conveying-belt surface 19-1. A first periphery 45-1 of the first coupling plate 41-1, the first periphery being oriented in the direction of the rear end of the first conveying-belt carrying arm 7-1, is provided with a first slot 47-1, which connects the plate surfaces of the first coupling plate 41-1 to one another. The upper side of the housing 11 has formed on it a first recess 49-1, into which the first coupling plate 49-1 can be inserted. The first slot 47-1 of the first coupling plate 41-1 coincides, in the inserted state, with the first crosspiece 43-1 of the conveying unit 3, which is formed within the conveying unit 3 in a region between the start of the channel 17 and the rear end 15. The first crosspiece 43-1 protrudes in the direction of the front end 13 and is formed in one piece here with the conveying unit 3. In the coupled state of the first conveying-belt carrying arm 7-1 and the conveying unit 3, the first crosspiece 43-1 engages in the first slot 47-1 and prevents the conveying-belt carrying arm 7-1 from moving perpendicularly to the conveying-belt surface 19-1.

FIG. 2A further shows a first electric motor 51-1 (in the form of a double-dot-dashed outline), which serves as a drive of the first conveying belt 5-1 (a second electric motor forming a drive of the second conveying belt 5-2 is not illustrated here).

The first electric motor 51-1 is arranged within the conveying unit 3, i.e. in the housing 11, and is coupled to a first drive pinion 53-1 (motor pinion), which projects upwards, in part, beyond the surface of the housing 11. The first drive pinion 53-1 may be in engagement with a corresponding first intermediate gearwheel 55-1 of the first conveying-belt carrying arm 7-1. The first intermediate gearwheel 55-1 is arranged in the first conveying-belt carrying arm 7-1 such that, in the coupled state, it is in engagement with the first motor pinion 53-1. The first intermediate gearwheel 55-1, furthermore, is in engagement with a first drive-roller gearwheel 57-1, which is coupled to the first drive roller 21-1. It is thus possible, in the coupled state of the first conveying-belt carrying arm 7-1 and the conveying unit 3, for the first electric motor 51-1 to drive the first conveying belt 5-1 via the first drive pinion 53-1, the first intermediate gearwheel 55-1, the first drive-roller gearwheel 57-1 and the first drive roller 21-1.

A coupling operation of the first conveying-belt carrying arm 7-1 and the conveying unit 3 will be described by way of example hereinbelow. The first conveying-belt carrying arm 7-1 is inserted from above the housing 11, by way of its two first pins 35-1, into the respectively associated first introduction portion 40-1 of the first groove 37-1 and is then pivoted about the first pins 35-1 in the direction of the upper side of the conveying unit 3, the first coupling plate 41-1 thus being inserted into the first recess 49-1 of the conveying unit 3. In this state, only a pivoting movement of the first conveying-belt carrying arm 7-1 about the first pins 35-1 and a displacement movement along the first grooves 37-1 are possible. Thereafter, the first conveying-belt carrying arm 7-1, which at this point is oriented essentially parallel to the conveying unit 3, is moved in the transporting direction T (along the first grooves 37-1), and therefore its two first pins 35-1 pass into the respectively associated first locking pin 39-1 of the first groove 37-1 and the first slot 47-1 engages with the first crosspiece 43-1. In this state, the first drive pinion 53-1 and the first intermediate gearwheel 55-1 are likewise in engagement with one another. The two first pins 35-1 are then locked, the coupling operation therefore being at an end. The first conveying-belt carrying arm 7-1, now, is coupled in a fixed state to the conveying unit 3 and the first conveying belt 5-1 can be driven by the first electric motor 51-1. The uncoupling operation of the first conveying-belt carrying arm 7-1 proceeds analogously to this, in reverse order.

Furthermore, FIG. 2A shows a printed circuit board 59, which is connected to the first electric motor 51-1 (for example also to the second electric motor) electrically to supply power and to control the first electric motor 51-1. The printed circuit board 59 is provided in the housing 11 of the conveying unit 3 and is protected against residual liquid by said housing. For example it is possible for the printed circuit board 59 to be connected (e.g. screwed) directly to an inner side of the housing 11 of the conveying unit, or for it to be fitted on a separate carrier plate of the input unit 1, said carrier plate being in an uncoupled state in relation to the conveying unit 3 (see description of the weighing machine hereinbelow).

The input unit 1 with its guide structure 9 for carrying the conveying unit 3 will be described hereinbelow with reference to FIG. 2A, FIG. 3A and FIG. 3B.

The guide structure 9 has a first and a second telescopic rail 63-1, 63-2. The conveying unit 3 is connected to a sole plate 61 via the first and the second telescopic rails 63-1, 63-2, which are respectively arranged on a right-hand and left-hand lower side of the conveying unit 3 and are connected to the housing 11. The sole plate 61 is fixed in the transporting direction T, as seen in relation to the housing of the reverse vending machine. A part of the telescopic rails 63-1, 63-2 which is fixed relative to the housing of the reverse vending machine is connected to the sole plate 61, and a movable part of the telescopic rails 63-1, 63-2 is connected to the conveying unit 3 (e.g. the housing 11). By means of the two telescopic rails 63-1, 63-2, the conveying unit 3 can be moved in the transporting direction T relative to the sole plate 61 in the manner of a pull-out drawer, i.e. from an operating position (pushed in) to a cleaning/maintenance position (extended). The conveying unit 3 is moved here by virtue of being pulled, e.g. by the maintenance staff. The pulling (or the return movement) is assisted, for example, by a gas pressure spring or a spring mechanism (not shown). At least in the operating position, the conveying unit 3 can be locked, in this case by a locking device 65. The locking device 65 is fitted at the front end 13 of the housing 11 and serves both for locking the conveying unit 3 on the sole plate 61 and as a handle for pulling out the conveying unit 3. It is further possible for the conveying unit 3 also to be capable of being fixed in the cleaning/maintenance position, for example by a force of the gas pressure spring, which acts against an end stop of the guide structure 9, in order to prevent undesired movement of the conveying unit 3. In addition, the conveying unit 3 can be released from the sole plate 61, i.e. there are coupling devices, e.g. quick-release fasteners or screw closures, provided between the conveying unit 3 and the telescopic rails 63-1, 63-2.

The input unit 1 is further provided with a weighing machine 71, by means of which it is possible to weigh the empty container transported on the conveying unit 3. The weighing machine 71 is arranged between the sole plate 61 and a base plate 73 of the reverse vending machine and is formed, for example, from a plurality of load cells. The base plate 73 is fixed in the reverse vending machine and carries the input unit 1. In other words, the weighing machine 71 makes it possible to measure a force which acts between the base plate 73 and the sole plate 61. It is thus possible to measure the weight of the empty container located on the conveying unit 3.

As already explained above, the printed circuit board 59 may be arranged on a carrier plate, which is fitted, for example, on the base plate 73 and is thus uncoupled from the weighing machine 71 or the conveying unit 3 in respect of forces. Vibrations which occur during transportation of the empty container can thus be kept away from the printed circuit board 59-1.

Figure 3A:
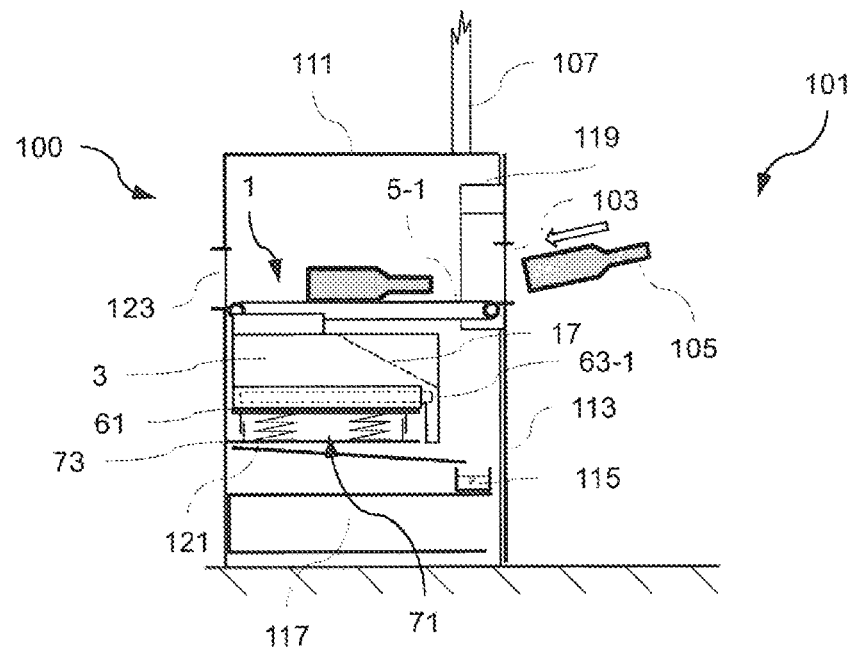
Figure 3B:
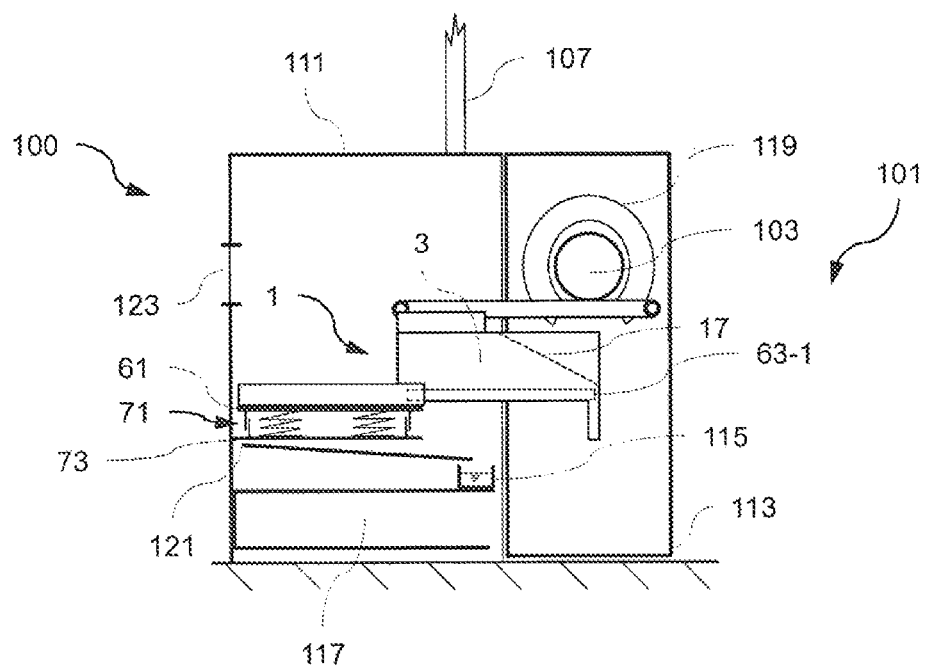
FIG. 3B shows a further schematic, lateral sectional view of the reverse vending machine from FIG. 3A, wherein the door is open and the conveying unit has been extended.
Figure 4:
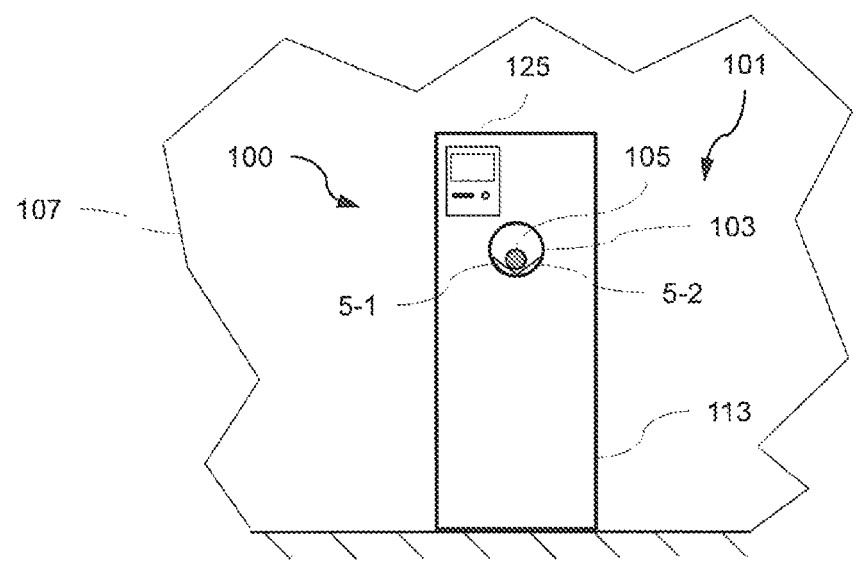
FIG. 4 shows a schematic front view of the reverse vending machine from FIG. 3A with the door closed.

FIG. 3A (lateral, schematic sectional view) and FIG. 4 (schematic front view) illustrate a reverse vending machine 100 with an embodiment of the abovedescribed input unit 1 in an operating state. FIG. 3B (lateral, schematic sectional view) illustrates the reverse vending machine 100 from FIG. 3A in a maintenance/cleaning state.

The reverse vending machine 100 is erected in a machine area 101 of a reverse vending facility (e.g. in a supermarket or beverage shop), and it is thus possible for consumers to introduce, and thus return, empty containers 105 into the reverse vending machine 100 on a front side of the reverse vending machine 100, through an input opening 103 provided there. The reverse vending machine 100 is usually erected such that at least its rear side is separated spatially from the machine area 101, e.g. by a wall 107. The handling of the empty container 105 takes place on the rear side of the reverse vending machine 100 (i.e. behind the wall 107), and therefore noise and odours caused by the empty-container handling are (to the greatest extent) kept away from the machine area 101.

The reverse vending machine 100 has a housing 111, a door 113, which closes the housing 111 on the front side thereof, the previously described input unit 1, a residual-liquid-collecting container 115 and a cleaning-equipment-stowage compartment 117 (which can optionally also be omitted). The door 113 is connected to the housing 111 in a pivotable manner, and therefore, in a closed state of the door 113 (see FIGS. 3A and 4), the input opening 103 provided therein coincides with the conveying belts 5-1, 5-2. The door 113 further has an empty-container-sensing device 119, which is arranged in the form of a collar around the input opening 101 on the inner side of the door 113, in order to sense the type of empty container 105 introduced into the reverse vending machine 100 through the input opening 103. The empty-container-sensing device 119 is designed such that, over an angle range of 360° around the input opening 103 as an empty container 105 is being introduced through the input opening 103, it senses the type of empty container 105 introduced, e.g. by sensing a barcode (for example also by way of cameras and/or in conjunction with the weighing machine 71) provided on the empty container 105. Such an empty-container-sensing device 119 is known and will not be described in any more detail. Furthermore, the residual-liquid-collecting container 115 is arranged in a front region of the reverse vending machine 100. Via an infeed 121 (e.g. a ramp), which is arranged in the reverse vending machine 100, beneath the input unit 1, the residual-liquid-collecting container 115 receives the residual liquid flowing out via the channel 17, said liquid therefore being collected in the residual-liquid-collecting container 115. In addition, the conveying belts 5-1, 5-2 coincide with a discharging opening 123, which is provided on the rear side of the reverse vending machine 100 and through which the empty container 105 can be discharged from the reverse vending machine 100. In addition, the outer side of the door 113 has arranged on it an input and output device 125, by means of which a user can communicate with the reverse vending machine 100 and which can dispense a token or voucher for the empty container 105 returned.

In the closed state of the door 113, as is shown in FIG. 3A and FIG. 4, the reverse vending machine 100 is in the operating state, and therefore empty containers 105 can be introduced. The empty container 105 introduced through the input opening 103 is sensed by the empty-container-sensing device 119 (e.g. also by the weighing machine 71) and the type of empty container is determined. The empty container 105 is then discharged from the reverse vending machine 100, through the discharging opening 123, by the transporting unit 3. Once the empty container has been returned, the user receives, from the input and output device 125, a token or voucher equivalent to the empty container 105 returned. A control device of the reverse vending machine 100, said device controlling the operation of the input unit 1, of the empty-container-sensing device 119, of the weighing machine 71, of the input and output device 125, etc., and the associated sensors of said control device are provided in the reverse vending machine 100, but are not explained in any more detail.

In the open state of the door 113, as is shown in FIG. 3B, the reverse vending machine 100 is in the maintenance/cleaning state. In this state, the conveying unit 3 is accessible, i.e. the conveying unit 3 can be pulled out of the reverse vending machine 100 in the forward direction by means of the guide structure 9 and is easily accessible for maintenance/cleaning work. As described above, the first and the second conveying-belt carrying arms 7-1, 7-2 can be released from the conveying unit 3 by means of the associated pivoting-action coupling devices 31-1, 31-2 and the associated displacement-action coupling device 33-1, 33-2 in order to be cleaned, for example, separately (in this case, the conveying belts 5-1, 5-2 can be moved freely, i.e. each portion thereof can be cleaned). The conveying unit 3 can be cleaned, as can the residual-liquid-collecting container 115, by means of detergents and equipment (e.g. dirt-dissolving agents, brushes, etc.) stored in the cleaning-equipment-stowage compartment 117. Following cleaning of the conveying unit 3 (and, for example, of the residual-liquid-collecting container 115), the conveying unit 3 can be pushed into the reverse vending machine 100 again along the transporting direction T and locked, and the door 113 can be closed again, the reverse vending machine 100 therefore being restored to the operating state.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An input unit for a reverse vending machine, the input unit comprising:
a conveying unit with at least one conveying belt configured to receive and transport an empty container; and
a guide structure configured to carry and guide the conveying unit relative to a housing of the reverse vending machine,
wherein the guide structure has at least one rail, on which the conveying unit is carried, and guided, in a displaceable manner and
wherein the at least one rail is designed in the form of a telescopic rail.

2. The input unit of claim 1,
wherein the conveying unit is designed such that the empty container placed on the at least one conveying belt can be transported along a transporting direction; and
wherein the guide structure is configured to carry and guide the conveying unit along the transporting direction.

3. The input unit of claim 1,
wherein the at least one conveying belt circulates on a conveying-belt carrying arm which, at one end, is coupled to the conveying unit in a releasable manner by a displacement-action coupling device and a pivoting-action coupling device.

4. The input unit of claim 1,
wherein the conveying unit is designed in the form of a drawer.

5. The input unit of claim 1, further comprising:
at least one drive for driving the at least one conveying belt.

6. The input unit of claim 1,
wherein the at least one drive has a motor.

7. The input unit of claim 1,
wherein the conveying unit is coupled to the guide structure in a releasable manner.

8. The input unit of claim 1,
wherein the conveying unit further comprises:
a carrier plate; and
one or more printed circuit boards which are mounted on the carrier plate and have at least one drive-control circuit.

9. The input unit of claim 1,
wherein the conveying unit has a plurality of conveying belts arranged at an angle in relation to one another.

10. The input unit of claim 9, further comprising:
a plurality of drives for driving the plurality of conveying belts;
wherein in each case one drive for driving a respectively associated conveying belt is coupled to the respective conveying belt.

11. The input unit of claim 1,
wherein the conveying unit further comprises:
a weighing machine with one or more load cells;
wherein the at least one conveying belt is arranged on the weighing machine.

12. The input unit of claim 11,
wherein the conveying unit further comprises:
a carrier plate; and
one or more printed circuit boards which are mounted on the carrier plate and have at least one drive-control circuit;
wherein the carrier plate is uncoupled from the weighing machine in respect of forces.

13. A reverse vending machine, comprising:
a housing;
a door with an opening through which to guide an empty container, the door being fastened on the housing in a pivotable manner;
an input unit, comprising:
a conveying unit with at least one conveying belt configured to receive and transport an empty container; and
a guide structure configured to carry and guide the conveying unit relative to a housing of the reverse vending machine,
wherein the conveying unit is arranged in the housing relative to the opening such that an empty container guided through the opening can be placed on the at least one conveying belt;
wherein, in a closed state of the door, access to the guide structure is prevented and
wherein, in an open state, the door allows access to the guide structure and the conveying unit can be moved counter to the transporting direction.

14. An input unit for a reverse vending machine, the input unit comprising:
a conveying unit with at least one conveying belt configured to receive and transport an empty container, wherein the conveying unit is designed in the form of a drawer; and
a guide structure configured to carry and guide the conveying unit relative to a housing of the reverse vending machine.

15. The input unit of claim 14,
wherein the conveying unit is designed such that the empty container placed on the at least one conveying belt can be transported along a transporting direction; and
wherein the guide structure is configured to carry and guide the conveying unit along the transporting direction.

16. The input unit of claim 14,
wherein the conveying unit has a plurality of conveying belts arranged at an angle in relation to one another.

17. The input unit of claim 14,
wherein the at least one conveying belt circulates on a conveying-belt carrying arm which, at one end, is coupled to the conveying unit in a releasable manner by a displacement-action coupling device and a pivoting-action coupling device.

18. The input unit of claim 14,
wherein the conveying unit further comprises:
a weighing machine with one or more load cells;

wherein the at least one conveying belt is arranged on the weighing machine.

19. The input unit of claim 14, wherein the guide structure has at least one rail, on which the conveying unit is carried, and guided, in a displaceable manner.

20. The input unit of claim 19, wherein the at least one rail is designed in the form of a telescopic rail.

* * * * *